(12) United States Patent
Molin et al.

(10) Patent No.: US 12,019,991 B2
(45) Date of Patent: Jun. 25, 2024

(54) NEURAL NETWORK FOR INTERPRETING SENTENCES OF A NATURAL LANGUAGE

(71) Applicant: OBSHCHESTVO S OGRANICHENNOJ OTVETSTVENNOSTYU "INVEK", Ekaterinburg (RU)

(72) Inventors: Mikhail Nikolaevich Molin, Patrushi (RU); Georgij Mikhajlovich Perskij, Ekaterinburg (RU)

(73) Assignee: OBSHCHESTVO S OGRANICHENNOJ OTVETSVETVENNOSTU "INVEK", Ekaterinburg (RU)

( * ) Notice: Subject to any disclaimer, the term of this patent is extended or adjusted under 35 U.S.C. 154(b) by 398 days.

(21) Appl. No.: 17/294,550

(22) PCT Filed: Nov. 14, 2019

(86) PCT No.: PCT/RU2019/000812
§ 371 (c)(1),
(2) Date: May 17, 2021

(87) PCT Pub. No.: WO2020/106180
PCT Pub. Date: May 28, 2020

(65) Prior Publication Data
US 2021/0334470 A1    Oct. 28, 2021

(30) Foreign Application Priority Data
Nov. 19, 2018 (RU) ........................... RU2018140784

(51) Int. Cl.
*G06N 3/04* (2023.01)
*G06F 40/284* (2020.01)
(Continued)

(52) U.S. Cl.
CPC ............ *G06F 40/30* (2020.01); *G06F 40/284* (2020.01); *G06F 40/289* (2020.01); *G06N 3/04* (2013.01); *G06N 3/08* (2013.01)

(58) Field of Classification Search
CPC ...... G06F 40/30; G06F 40/284; G06F 40/289; G06N 3/04; G06N 3/08
See application file for complete search history.

(56) References Cited

U.S. PATENT DOCUMENTS

| | | | |
|---|---|---|---|
| 5,416,696 A | 5/1995 | Suzuoka et al. | |
| 2017/0076199 A1 | 3/2017 | Zhang et al. | |
| 2018/0046618 A1 | 2/2018 | Lee et al. | |

FOREIGN PATENT DOCUMENTS

| | | | | |
|---|---|---|---|---|
| DE | 4209296 A1 * | 9/1993 | ............. | G06N 3/063 |
| RU | 2 368 946 C2 | 9/2009 | | |

OTHER PUBLICATIONS

International Search Report of PCT/RU2019/000812 dated Feb. 20, 2020 [PCT/ISA/210].

* cited by examiner

*Primary Examiner* — Sonia L Gay

(57) ABSTRACT

The invention relates to computer systems and is intended for interpreting sentences in a natural language. A neural network consists of layers of neurons. A first neuron layer is intended for interpreting the meanings of individual words in a sentence. Intermediate neuron layers are intended for interpreting phrases in a sentence, in which the number of words in a phrase corresponds to the number of the neuron layer. The last neuron layer is represented by an output neuron and is intended for interpreting a sentence on the basis of the lexical meanings interpreted in the preceding neuron layers. Each neuron of the input and intermediate layers comprises a memory cell intended for storing the meanings of a word or a phrase. Moreover, in order to (Continued)

improve the quality of interpretation, each such meaning is assigned a binary feature, the coding of which is described according to the rule whereby "1" is the primary meaning of a word or phrase and "0" is the secondary meaning of the word or word group.

8 Claims, 1 Drawing Sheet

(51) Int. Cl.
  *G06F 40/289* (2020.01)
  *G06F 40/30* (2020.01)
  *G06N 3/08* (2023.01)

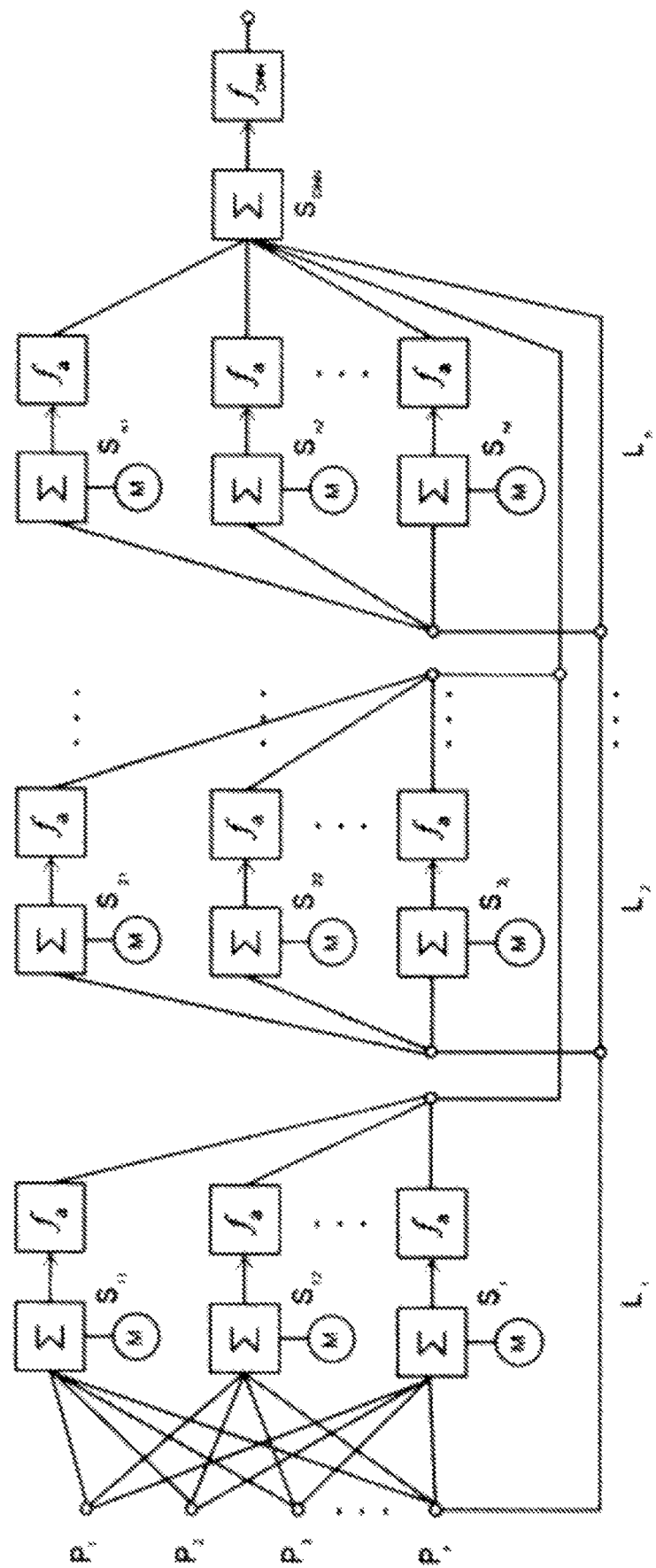

NEURAL NETWORK FOR INTERPRETING SENTENCES OF A NATURAL LANGUAGE

CROSS REFERENCE TO RELATED APPLICATIONS

This application is a National Stage of International Application No. PCT/RU2019/000812, filed Nov. 14, 2019, claiming priority to Russian Patent Application No. 2018140784, filed Nov. 19, 2018.

TECHNICAL FIELD

The present invention relates to computational tools for interpreting sentences of a natural language, including performing context-sensitive machine translation. The invention may be used in various industrial and social fields, where interlingual communication management is a requirement.

PRIOR ART

Communications management is one of the competencies highlighted in the Project Management Body of Knowledge (PMBOK). It is precisely the development of international cooperation that has given rise to a growing need for quality communication between stakeholders in projects. Similarly, the language barrier often is an issue, complicating interpersonal communication, as well as understanding the substance of texts of a technical nature.

Another problem related to projects requiring intensive translation of messages from a source language to a target language is to exploit the expertise of expert translators, which is lost at the end of a project on account of insufficient digitization of such expertise for subsequent use in projects containing similar or identical topics. A generally accepted indicator of translation quality is the relevance of the translated corpus of phrases for the context, which the project participants process, i.e., the quality of the translation is depends directly on the context.

In one example, the Reverso Context web service (access mode: http://context.reverso.net/), known in the prior art, provides text translation based on previously translations performed by professional translators. Open the user's request, the specified server provides a sampling in the target language of the meanings of source words or phrases in different contexts. Here, the user receives context options, in which a word or a phrase in the original language can be used. However, this known resource does not inform the user as to whether the translation result represents a primary or secondary meaning. A further drawback of this resource is its deficiency in combining the meanings of words and phrases, whereby they may be interpreted as a part of a complete sentence. For example, at the date of filing this application, the translation of the sentence "Nobody can go back and start a new beginning, but anyone can start today and make a new ending" is performed by a known resource like this: " Никто не может возвращаться и начинать новое начало, но любой может начинать сегодня и делать новое окончание." This example shows the limitations in terms of functionality, when using a prior-art service.

The following equivalents are known from the patent literature. U.S. Pat. No. 8,533,130 (IPC G06F15/18, publ. Sep. 10, 2013) discloses a device, in which the use of a neural network is intended to annotate search results. This device consists of a memory connected to a processor and a neural network. The neural network consists of a plurality of word neurons, a plurality of sentence neurons, at least one document neuron, a plurality of connections between at least some word neurons and sentence neurons, and a plurality of connections between at least some word neurons and a document neuron. Thus, the neural network is configured to be able to activate one of the sentence neurons in response to the activation of the document neuron. The device processor is configured to change the position of a plurality of word-neurons on the display depending on the input data, whereby changing the position of a single word neuron results in a change in the annotation related to at least one of the sentence neurons. The known invention makes it possible to produce a brief summary of the essence of the information through the use of a neural network. However, by using a known solution for interpreting sentences may result in a complete or partial loss of the meanings contained in some of the original sentences.

U.S. Pat. No. 5,416,696 (IPC G06F17/27, publ. May 16, 1995) discloses a device and a method for translating words using a neural network. The neural network according to this known invention contains neurons, in the memory cells of which, associated meanings of words of the source and target languages are stored. Neurons are interconnected through positive and negative connections associated with words in different languages, which are linguistically and semantically proximate. Moreover, the device making use of this neural network has a memory, which contains the grammar rules covering the source and target languages. нейронную сеть, также содержит память с правилами грамматики для оригинального и целевого языков. When interpreting a source sentence, the device displays the output to the user based on the word order of the source sentence allowing it to convey the literal meaning of the source sentence. However, when using the known invention, the result may also be a partial loss of the original sentence meaning, in that the neural network memory cells are not configured to store language structures consisting of several words or phrases.

DISCLOSURE OF THE ESSENCE OF THE INVENTION

The technical problem to be addressed by the developers is to create a multilayer neural network, which is configured to interpret the original information in order to present it in a language, which is relevant to the user of such information.

The improvement of the quality of interpreting natural language sentences by leveraging the experience of experts represents the technical result of the present invention.

This technical result is achieved by the present invention, whereby the claimed neural network for interpreting natural language sentences comprises layers of neurons. Further, the first neuron layer is designed to interpret the meanings of individual words of a sentence. Intermediate neuron layers are configured for interpreting a phrase of a sentence, in which the number of words corresponds to the number of the neuron layer in the neural network. The last neuron layer is represented by an output neuron and is configured to interpret a sentence based on the lexical meanings, which were interpreted in the preceding neuron layers. Thus, each neuron of the input and intermediate layers contains a memory cell for storing the meanings of a word or a phrase, wherein each meaning corresponds to a binary feature, the encoding of which is characterized by the following rule: "1" being the basic meaning of the word or phrase, "0" being the additional meaning of the word or phrase.

For the purposes of this application, the meaning of the term "interpretation" will be primarily used to refer to the process of translating from the source language to the target language. However, the use of this term may be applicable to other areas of technology, which require transformation of the source information in order to make it easier to understand for a user.

Where the present invention differs from the technical solutions known from the prior art is primarily as follows: it configures neurons of a separate layer of the neural network for interpreting a phrase, in which the number of words equals the number of the layer in the neural network; it assigns a binary feature to the meaning of the interpreted word or phrase, thus indicating the basic or additional meaning of the interpreted word or phrase; the output neuron performs a combination of words and phrases taking into account their basic or additional meaning and the word order of the source sentence. During the analysis of publicly available information in the scientific-technical and patent literature, no technical solutions were identified, which have identical essential features and provide the technical result achieved when implementing the present invention.

The following exemplary embodiments of the present invention cannot be used to limit the inventive concept postulated by the claims of the present invention. The provided examples serve to illustrate in more detail the essence of the invention, and the invention itself is not limited to the specific details presented.

BRIEF DESCRIPTION OF THE DRAWINGS

FIG. 1 shows a neural network for interpreting natural language sentences.

DESCRIPTION OF THE EMBODIMENTS

Interpretation is one of the cognitive functions of the human brain, which allows for the understanding of informational content in a rules-based fashion. The interpretation feature may be implemented, when the information needs to be translated into another state in order to understand the essence of the information. For example, in order to understand the meaning of a mathematical formula written in a language based on the strict formalism of mathematical logic, it must be possible to match the mathematical symbols with their semantic substantive content characteristic of the target language. A similar problem may also arise, when a sentence needs to be transformed in one and the same language, allowing for the selection of synonymous words, which are more appropriate in a specific situation, depending on the context and the chosen register, i.e., colloquial, formal, elevated language, etc Similar situations may arise, when researchers work with scientific publications laden with complex terminology, which is not always accessible to an unprepared reader. Thus, interpretation of a text can be done when handling terms within a single language and also when dealing with foreign literature, whenever translation to the target language of a source sentence or text fragment of the original language is required.

In particular, specifically in the field of translation studies, this problem is the focus of much attention, in which, e.g., tasks that will ensure interlingual communications in terms of projects related to international cooperation are solved. In the course of such projects, significant volumes of translations are accumulated, performed by professional translators as part of a specific project. This means that within the same project there is a high probability that a certain source-language word will have one project-specific basic meaning in the target language. Here, foreign words not specific to the project will have additional meanings. Collecting and capturing such knowledge will make it possible in the future to reuse the expertise of expert translators, which will have a positive impact on the speed and quality of translations within the same subject area. The same also applies to academic collaborative projects in a particular field of science or technology.

During the previous stage of developing information systems, the tasks of analyzing, modeling and interpreting user information were solved by classifying source information elements and using ontological modeling, in which a hierarchical structure of assigning features to records of the knowledge base is used. The complexity of the structure of such ontology allows for the detailed sorting of records of a knowledge base by specialization, and by analogy with books stored in different library depart cents. However, upon completing this sorting, these records of the knowledge base and the relationships assigned thereto will reflect only this established classification, i.e., their use in processing subsequent user information, the structure of which is as yet unknown to the user, and will not ensure their effective use in interpreting new information.

The creation of tools for interpreting sentences expressed in a natural language may be solved by creating a trainable neuronal network in the memory cells of neurons, wherein the semantic values of the original words and phrases are stored. Neural networks traditionally are being put to use in areas, which require the expert's knowledge be reflected as it pertains to the changing conditions of the external environment.

This feature of adapting or teaching a person to respond correctly through actions in a particular environment corresponds to the main problem, which is solved by supervised machine learning. Said problem consists in approximating the input data for set phrases and grammatical structures in order to obtain the most accurate output response through the use of a training set, i.e., the source text sentence, by comparing it with the testing set, which represents the basic and additional meanings of the source words and phrases previously stored in the neural network, and subsequently training the neural network using the basic and additional meanings of the new words, set phrases and grammatical structures.

In order to illustrate the present invention more clearly, all the below examples relate to the interpretation of a natural language sentence in terms of performing the translation of source words, phrases and sentences of the original language to the target language.

According to FIG. 1, a neural network for interpreting natural language sentences consists of several layers $L_n$, where n represents the number of the layer. The first layer of the neural network, $L_1$, is configured to interpret the meanings of individual source-text words. The second layer of the neural network, $L_2$, is configured to interpret separate phrases made up of two words Similarly, the $N^{th}$ layer, $L_n$, is configured to interpret phrases consisting of n words.

Each layer consists of neurons S. Each neuron $S_{1i}$ of the first layer $L_1$ has a memory cell taken from the plurality of memory cells M, which contains a rule for interpreting one word of the source language into the target language. The interpretation rule consists of assigning a binary feature to the meaning of a word in the source language. Thus, if the binary feature "1" is applied to the meaning of an arbitrary word of the target language, it represents the basic meaning. Other translation variants are assigned the binary feature "0," whereby this variant represents an additional meaning. The assignment of a binary feature may be performed, e.g., by an expert translator, who trains the neural network and is knowledgeable in the context of the translation. In another example, the feature may be assigned by taking into account the statistical indicator of the frequency of a translation variant of a word or a phrase in large amounts of information, e.g., when comparing bilingual corpora of texts translated by expert translators.

Each neuron of each layer corresponds to the sequence of activation symbols, i.e., if the word "nobody" occurs in the source text, the neuron $S_{1t}$ is activated, the memory cell of which stores the values of the word "nobody" in the target language. When a neuron is activated, its target function $f_a$, is performed, which consists in transferring the basic value of the word or phrase to the input of the neuron $S_{DNN}$ of the last layer, which represents the output adder. The neural network assembly is fully connected, i.e., it supports parallel processing of the source language text by all neurons of the network, including the output adder $S_{DNN}$. The said feature is also illustrated in FIG. 1, according to which the input symbol sequences $P_1, P_2, P_3, \ldots, P_k$ are received simultaneously at the inputs of neurons of all the layers L of the neural network, and at the input of the output adder $S_{DNN}$. Sequences of input characters may be represented by separate words and phrases of the source sentence, the whole source sentence, major text fragments, and the results of voice input.

The target function $f_{DNN}$ of the output adder is aggregate the interpretation results of the previous layers taking into account the word order of the source sentence and return the original sentence in the target language to the user. The resulting sentence may be returned to the user both as a structure consisting only of basic lexical meanings and as a structure consisting of additional meanings.

If the meaning of a word in the source sentence of the target language is not stored in the memory cell of a network neuron, then the output adder SDNN returns this word in the original language in the text received by the user.

In order to illustrate the present invention more clearly, English appears as the source language and Russian appears as the target language in the following example The original sentence in English is:

"Nobody can go back and start a new beginning, but anyone can start today and make a new ending."

The following elements of the sentence structure, represented by words and set phrases, are identifiable by an expert, when analyzing the sentence structure: "nobody can," "go back," "and," "start a new beginning," "but," "anyone can," "start," "today," "and," "make a new ending."

The trained neural network works efficiently, if neurons of the first layer of individual words and neurons of set phrases and grammatical constructions of the second and subsequent layers are created therein. In case none of the neurons in the network can return the meaning of the word in the target language, then in the interpreted sentence, the user is shown this word in the original language. The occurrence of such a situation may signal to the expert that the neural network needs additional training. If the neural network outputs a word in the source language giving it a meaning that is deprecated, this too can signal to the expert the need for making changes in one of the neural network layers in order to create a neuron, which stores the meaning of the context against which, the accuracy of the translation may be compared. Thus, for example, the words "go" and "back" separately may have the basic meanings in the Russian language of "go" and "back," respectively. However, the phrase "go back" in the English language is set. Therefore, it is logical to keep the phrase "go back" in its basic meaning "to return" in the second layer of the neural network.

To translate the above sentence, which is provided as an example, the neurons of the first neural network layer $L_1$ should store the meanings in Russian of the words "nobody," "can," "go," "back," "and," "start," "a," "new," "beginning," "but," "anyone," "start," "today," "make," and "ending."

The neurons of the second neural network layer $L_2$ should store the meanings of the following phrases:

"nobody can"—"никто не может";
"go back"—"вернуться обратно";
"anyone can"—"каждый может"
"new beginning"—"новое начало";
"new ending"—"новое окончание".

The second layer may also store other possible combinations of words occurring in the original sentence. Although storing non-set phrases may be redundant in some cases, the neural network may nevertheless have the capacity to resolve ambiguities that are encountered.

Moreover, in order to provide further information to the user, many additional meanings of phrases may also be stored in neuronal memory cells, e.g.:

«new beginning»—«новое начало»—1;
«new beginning»—«начало нового проекта»—0;
«new beginning»—«начало нового этапа»—0;
«new beginning»—«начало новой жизни»—0;
«new beginning»—«новая возможность»—0;
«new beginning»—«новая отправная точка»—0;
«new beginning»—«новое дело»—0;
«new beginning»—«новое начинание»—0;
«new beginning»—«новое предприятие»—0;
«new beginning»—«новый проект»—0;
«new beginning»—«новый шанс»—0;
«new beginning»—«новый этап»—0.

In this case, "1" represents the value of the binary feature assigned to the basic meaning of the phrase in the target language, "0" represents the value of the binary feature assigned to the additional meaning of the phrase in the target language.

For the phrase "new ending," storing the meanings of the phrase will be done by analogy:

«new ending»—«новое окончание»—1;
«new ending»—«новая концовка»—0;
"new ending"—"new completion"—0;
«new ending»—«новый финал»—0.

Thus, the aforementioned set phrases "new beginning" and "new ending" are sub elements of two other phrases in the sentence, i.e., "make a new beginning" and "make a new ending". As a result of training, the memory cells of two neurons of the fourth neural-network layer $L_4$ contain the following lexical meanings:

«make a new beginning»—«начать все заново»—1
«make a new beginning»—«начать новое дело»—0
«make a new beginning»—«начать с начала»—0
«make a new beginning»—«начать с чистого листа»—0
«make a new ending»—»завершить определенное новое дело»—1
"make a new ending"—"make a new ending"—0
«make a new ending»—«сделать новую концовку»—0
«make a new ending»—«сделать новый финал»—0

The neural network according to the present invention is fully connected, i.e., the original sentence is interpreted in parallel by all the layers of the network, including the output adder neuron $S_{DNN}$ This means, e.g., that with the neuron $S_{DNN}$ values are received simultaneously from the neurons of the first layer $L_1$ related to the words "make," "a," "new," "beginning," as is the meaning of the phrase "make a new beginning," i.e., from a neuron of the fourth layer $L_4$, and when interpreting the source sentence, priority is given to the meaning received from an older layer of the network. Given the word order features of the original sentence, the neuron $S_{DNN}$ aggregates the produced meanings in the same order. Thus, the output sentence will have the following appearance: " Никто не может вернуться обратно и начать все заново, но каждый может начать сегодня и завершить определенное новое дело ." ["No one can go back and start over, but everyone can start today and complete a certain new thing."]

The user then analyzes the accuracy of the interpretation and conducts interactive training for the new elements of the input data contained therein by creating new neurons in the relevant network layers in order to optimize the produced result.

At the same time, in order to complete the information provided to the user, the neural network displays all the meanings of words and phrases containing input data, thereby ensuring the accuracy of the interpretation of new phrases, the processing of which is the task of the new network neurons.

It should be noted that for more efficient network operation, neurons may also contain meanings of various word forms in the original language. Thus, in the case of the word "go," meanings may be stored next to the other possible forms "goes," "going," "gone," "have gone," "has gone," "has been going," etc. The same applies when translating while considering the person of the verb form. In this case, the neural network will store meanings for the phrases "she has gone," "he has gone," "he is going," and so on.

The source of data for training the neural network may be data from the Reverso Context service, as an example, and which is known from the prior art and contains bilingual text corpora translated by professional translators.

The functionality of the claimed neural network for interpreting a sentence to a natural language may be implemented partially or fully by one or more hardware logic components. These components may be represented, e.g., by a field programmable gate array (FPGA), application specific integrated circuit (ASIC), a standard application specific integrated circuit (ASSP), a system on chip (SOC), a complex programmable logic device (CPLD), or another type of configurable processor device.

In different embodiments, the present invention may also be used in connection with a client-server software product, wherein the client device may be a personal computer or a mobile device and sharing the functionality made available by the present invention between the client device and the server. In addition, the present invention may be used as part of a cloud-based software product, in which the total functionality made available by the present invention is transferred to the server side, and the client device is equipped only with a web browser, or other means of accessing the Internet server, providing the user with a graphical user interface generated by the internet server.

INDUSTRIAL APPLICATION

The improvement of the quality of the interpretation of sentences of a natural language by reusing the experience of experts represents the technical result obtained by implementing the present invention. The invention may be used in automated information systems of a more generic purpose and designed to organize the interlingual communication process, including in all systems, where conversion of the source text from one language form to another is required.

What is claimed is:

1. A non-transitory computer-readable storage medium storing thereon a set of executable instruction for a neural network for the interpretation of natural language sentences, consisting of neurons' layers, the set of executable instructions is configured, when executed by at least one processor to:
    using a first input neuron layer, interpret the meanings of individual words of a sentence phrase;
    using an intermediate neuron layer interpret the sentence phrases, the number of individual words corresponding to the number of the intermediate neuron layer in the neural network; and
    using a last layer of neurons, represented by an output neuron interpret the sentence phrase based on the interpreted lexical meanings in the intermediate neuron layers, wherein each neuron of the first input and intermediate layers contains a memory cell configured to store the meanings of a word or a phrase, respectively, wherein each such meaning corresponds to a binary feature, the coding of which is described by "1" representing the basic meaning of the word or phrase, and "0" representing an additional meaning of the word or phrase.

2. The non-transitory computer-readable storage medium of claim 1, wherein the criterion for determining the binary sign of the meaning of the word or the phrase in the neural network, is the greatest statistical indicator of their use in large amounts of information.

3. The non-transitory computer-readable storage medium of claim 1, wherein the criterion for determining the binary feature of the meaning of the word or the phrase in the neural network represents an assessment made by an expert, when training the neural network, taking into account the context of the use of the word or the phrase.

4. The non-transitory computer-readable storage medium of claim 1, wherein each neuron of the first input layer and the intermediate layers in the neural network, corresponds to a target function of assigning a basic or additional meaning of the word or the phrase for the user and transferring the basic meaning to the output neuron.

5. The non-transitory computer-readable storage medium of claim 4, wherein the execution of the target function of the first input or intermediate layers' neuron in the neural network, is performed upon activating the first input or intermediate layers' neuron.

6. The non-transitory computer-readable storage medium of claim 5, wherein the condition for activating the first input or intermediate layers' neuron in the neural network is to match the input word or the input phrase, respectively, with the meanings of the word or the phrase, which are recorded in the neuron memory cell.

7. The non-transitory computer-readable storage medium of claim 1, wherein the target function of the output neuron in the neural network, is to add the meanings of words and phrases, the meanings of which are interpreted in the first input and the intermediate neuron layers.

8. The non-transitory computer-readable storage medium of claim 1, implemented on a field-programmable gate array (FPGA).

* * * * *